(12) United States Patent
Singh et al.

(10) Patent No.: US 9,229,588 B2
(45) Date of Patent: Jan. 5, 2016

(54) TOUCH-SENSITIVE DISPLAY

(71) Applicant: RESEARCH IN MOTION LIMITED, Waterloo (CA)

(72) Inventors: Amit Pal Singh, Waterloo (CA); Bin Zhang, Toronto (CA); John Edward Dolson, Carp (CA)

(73) Assignee: BlackBerry Limited, Waterloo (CA)

( * ) Notice: Subject to any disclaimer, the term of this patent is extended or adjusted under 35 U.S.C. 154(b) by 226 days.

(21) Appl. No.: 13/630,675

(22) Filed: Sep. 28, 2012

(65) Prior Publication Data

US 2014/0092026 A1    Apr. 3, 2014

(51) Int. Cl.
*G06F 3/044* (2006.01)

(52) U.S. Cl.
CPC ..................................... *G06F 3/044* (2013.01)

(58) Field of Classification Search
None
See application file for complete search history.

(56) References Cited

U.S. PATENT DOCUMENTS

| | | | |
|---|---|---|---|
| 2010/0214247 A1* | 8/2010 | Tang et al. | 345/173 |
| 2011/0007020 A1* | 1/2011 | Hong et al. | 345/174 |
| 2011/0017524 A1* | 1/2011 | Chen et al. | 178/18.06 |
| 2011/0057887 A1* | 3/2011 | Lin et al. | 345/173 |
| 2012/0062503 A1* | 3/2012 | Zhuang et al. | 345/174 |
| 2012/0073124 A1 | 3/2012 | Chien et al. | |
| 2012/0168767 A1 | 7/2012 | Terashima | |

FOREIGN PATENT DOCUMENTS

| | | |
|---|---|---|
| EP | 2447815 A2 | 5/2012 |
| WO | 2012/021524 A2 | 2/2012 |

OTHER PUBLICATIONS

Office Action dated Sep. 16, 2013, issued in corresponding European Patent Application No. 12186607.3.
Extended European Search Report dated Feb. 14, 2013, issued in respect of corresponding European Patent Application No. 12186607.3.
Office Action dated Sep. 26, 2014, issued in respect of corresponding Korean Patent Application No. 10-2013-0114213 (English translation not available).
Office Action dated Dec. 23, 2014, issued in respect of corresponding European Patent Application No. 12186607.3.

* cited by examiner

*Primary Examiner* — Quan-Zhen Wang
*Assistant Examiner* — Chad Dicke
(74) *Attorney, Agent, or Firm* — Geoffrey deKleine; Borden Ladner Gervais LLP

(57) ABSTRACT

A touch-sensitive display includes a sense electrode comprising a first conductor having a first elongate edge and a second elongate edge that is longer than the first elongate edge, and a second conductor having a third elongate edge and a fourth elongate edge that is longer than the third elongate edge, wherein the first conductor is coupled to the second conductor and spaced from the second conductor such that a first distance from an end of the second elongate edge to an end of the fourth elongate edge is less than a second distance from an end of the first elongate edge to an end of the third elongate edge. The touch-sensitive display also includes a drive electrode spaced from the first conductor and the second conductor and extending between the first conductor and the second conductor.

10 Claims, 2 Drawing Sheets

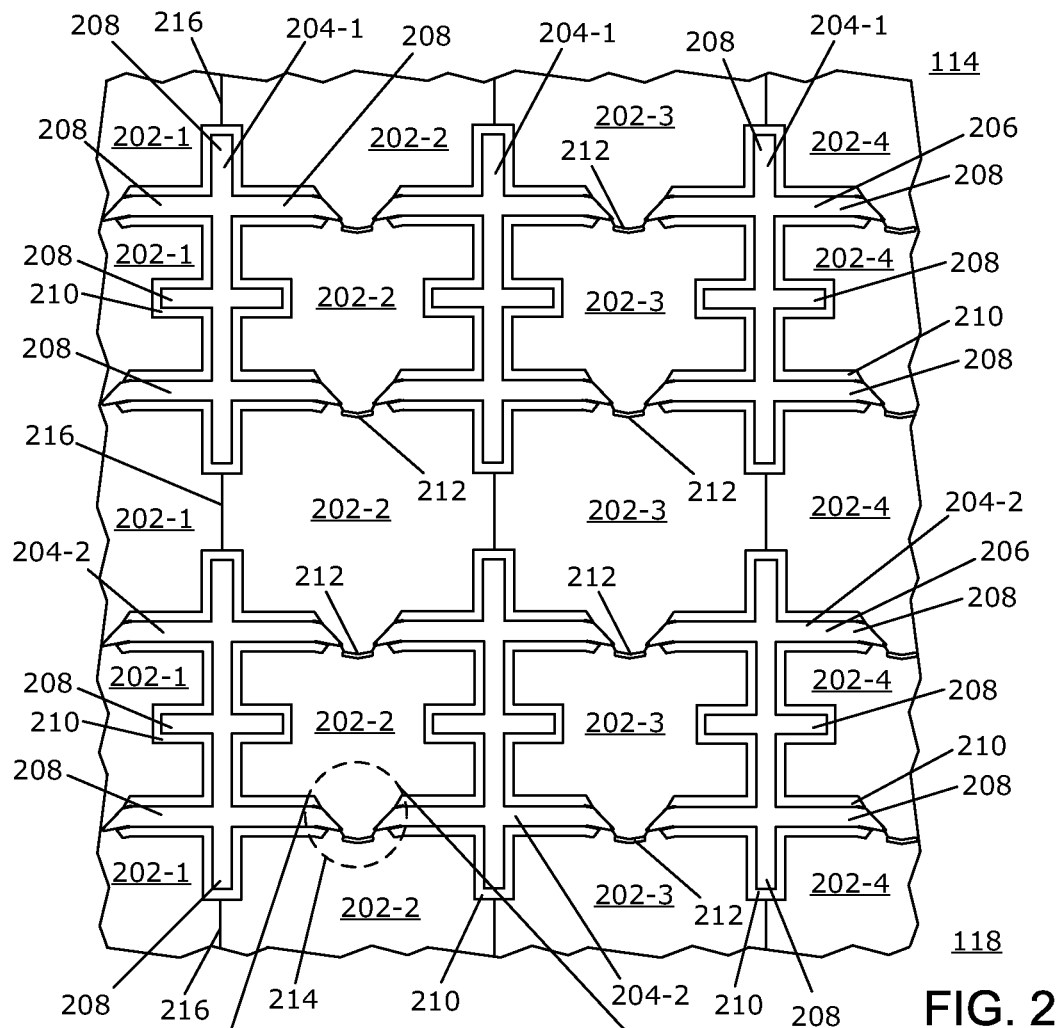
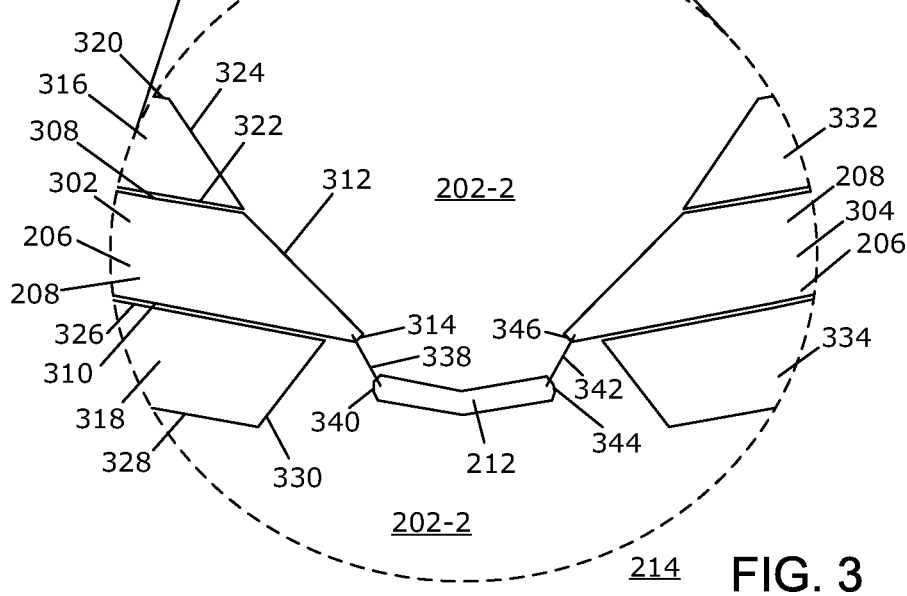
FIG. 2
FIG. 3

TOUCH-SENSITIVE DISPLAY

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

FIG. 2 is a top view of a section of touch sensors of a touch-sensitive display of an electronic device in accordance with the disclosure.

FIG. 3 is an expanded top view of a section of touch sensors of a touch-sensitive display of an electronic device in accordance with the disclosure.

DETAILED DESCRIPTION

Figure 1:
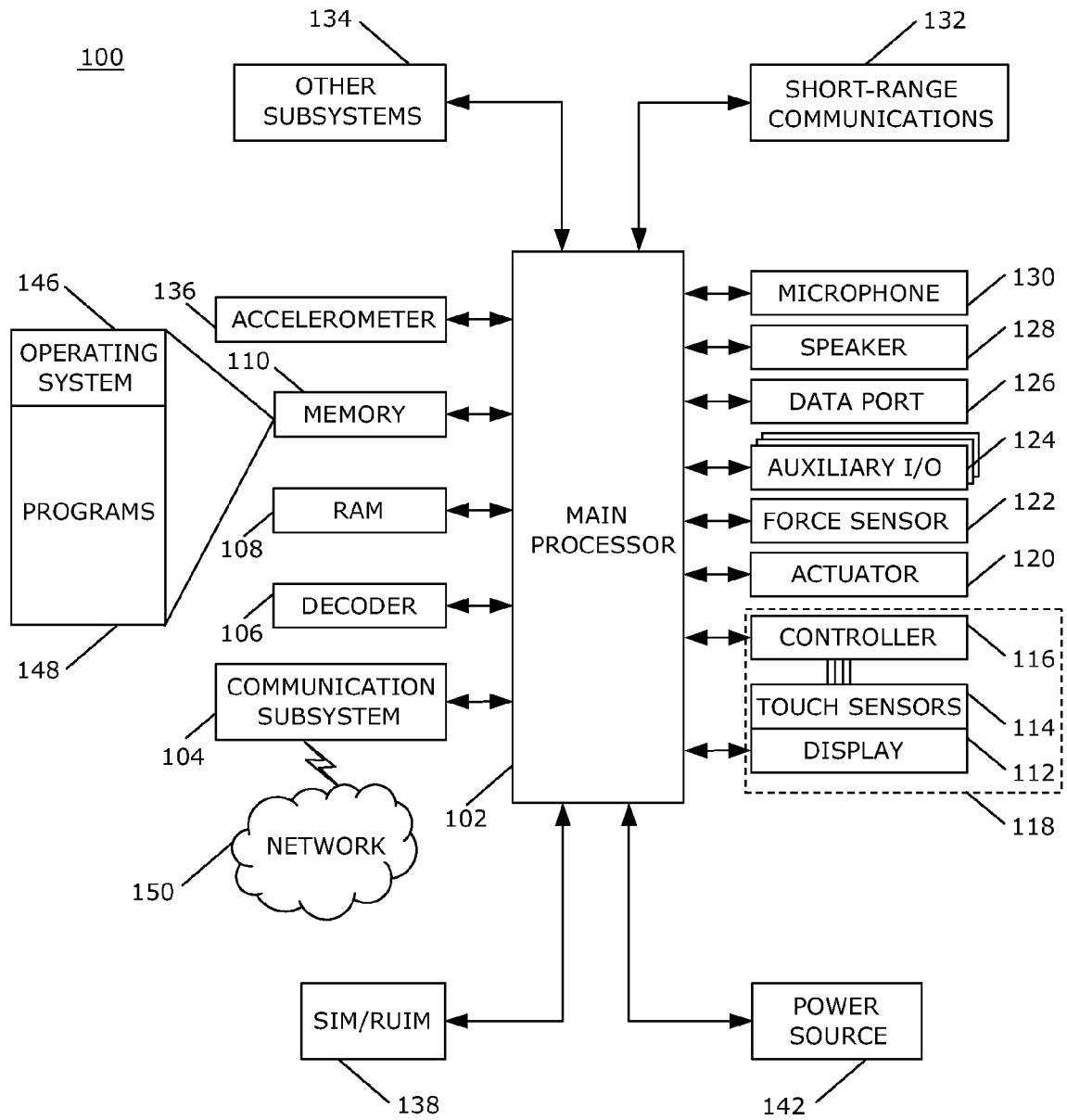
FIG. 1 is a block diagram of a portable electronic device in accordance with the disclosure.

The following describes an electronic device and a touch-sensitive display that includes a sense electrode comprising a first conductor having a first elongate edge and a second elongate edge that is longer than the first elongate edge, and a second conductor having a third elongate edge and a fourth elongate edge that is longer than the third elongate edge, wherein the first conductor is coupled to the second conductor and spaced from the second conductor such that a first distance from an end of the second elongate edge to an end of the fourth elongate edge is less than a second distance from an end of the first elongate edge to an end of the third elongate edge. The touch-sensitive display also includes a drive electrode spaced from the first conductor and the second conductor and extending between the first conductor and the second conductor.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display that includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

In touch-sensitive displays 118 with touch sensors 114 that include both drive and sense electrodes substantially on the same plane of the touch-sensitive display 118, the sense electrodes include groups of conductors that may be spaced apart at locations where the drive electrodes extend. The touch-sensitive display 118 includes a plurality of drive electrodes 202-1, 202-2, 202-3, 202-4 (202 generally) and sense electrodes 204-1, 204-2 (204 generally) to detect touches on the touch-sensitive display 118. Each section labeled as 202-1 is part of the same drive electrode 202-1. Each section labeled as 204-1 is part of the same sense electrode 204-1. Other drive electrodes and sense electrodes are labeled similarly in the drawings. The groups of conductors are coupled together utilizing, for example, jumpers and wires to facilitate touch sensing. The resistance of the drive electrodes 202 is typically highest where the conductors of the sense electrodes 204 are closest together. The scanning rate is affected by the resistance in the drive electrodes such that the scanning speed is reduced with increasing resistance.

A top view of a section of the touch sensors 114 of a touch-sensitive display 118 of an electronic device 100 is shown in FIG. 2. The touch-sensitive display 118 includes the drive electrodes 202-1, 202-2, 202-3, 202-4 and the sense electrodes 204-1, 204-2. The sense electrodes 204-1, 204-2 include a plurality of conductors 206 that are coupled together such that the sense electrodes 204-1, 204-2 generally extend substantially across the entire width of the display area and, optionally, into the non-display area. The drive electrodes 202-1, 202-2, 202-3, 202-4 extend between the conductors 206 that are coupled together such that the drive electrodes 202-1, 202-2, 202-3, 202-4 extend substantially across the entire length of the touch-sensitive display 118 and, optionally, into the non-display area. The drive electrode 202-1 is spaced from the drive electrode 202-2 by spaces 216 such that the drive electrode 202-1 is not electrically connected to the drive electrode 202-2. The drive electrode 202-2 is also spaced from the drive electrode 202-3, and the drive electrode 202-3 is spaced from the drive electrode 202-4, and so forth.

The touch-sensitive display 118 includes a plurality of such drive electrodes 202-1, 202-2, 202-3, 202-4 and sense electrodes 204-1, 204-2 in a repeating pattern. The drive electrodes 202-1, 202-2, 202-3, 202-4 and the sense electrodes 204-1, 204-2 are disposed substantially on the same plane of the touch-sensitive display 118. Parts of four drive electrodes 202-1, 202-2, 202-3, 202-4 and parts of two sense electrodes 204-1, 204-2 are illustrated in this example. The elements labeled 202-1 in FIG. 2 are part of one drive electrode, the elements labeled 202-2 are part of another drive electrode, the elements labeled 202-3 are part of another drive electrode, and the elements labeled 202-4 are part of yet another drive electrode. The elements labeled 204-1 in FIG. 2 are part of one sense electrode, and the elements labeled 204-2 are part of another sense electrode. Thus, neither an entire drive electrode nor an entire sense electrode is shown in FIG. 2, but rather sections of the electrodes 202-1, 202-2, 202-3, 202-4, 204-1, 204-2 are shown. The touch-sensitive display may include, for example, 12 drive electrodes and 16 sense electrodes.

The conductors 206 comprise a plurality of members 208 of various shapes and sizes. In this example, the conductors 206 include a central member and three members extending from each side of the central member. Other shapes and orientations may be successfully implemented. Ends of two of the members 208 of a conductor 206 are coupled to ends of two of the members of the next or adjacent conductor 206 via jumpers 212.

The drive electrodes 202-1, 202-2, 202-3, 202-4 and the sense electrodes 204-1, 204-2 may be utilized to detect a touch by mutual-capacitance touch sensing. The controller 116 drives the drive electrodes 202-1, 202-2, 202-3, 202-4 to detect a touch such that the drive signal is conducted through the drive electrodes 202-1, 202-2, 202-3, 202-4. The sense electrodes 204-1, 204-2 are utilized to detect changes in the signal near locations where conductors are coupled together, while the drive electrodes 202-1, 202-2, 202-3, 202-4 are driven. To determine a touch location, the touch-sensitive display 118 is scanned by driving the drive electrodes 202-1, 202-2, 202-3, 202-4 while signals from groups of conductors 206 that are coupled together are received at the touch controller 116.

Spacers 210, also known as floating islands, are utilized between the sense electrodes 204-1, 204-2 and the drive electrodes 202-1, 202-2, 202-3, 202-4 to reduce cross coupling between the drive electrode 202-2 and the conductor 302. The spacers 210 are not all identical and have different shapes. The spacers 210 extend along edges of the conductors 206 such that four spacers 210 extend along edges of each conductor 206.

An expanded view of a section 214 of the touch-sensitive display 118 of the electronic device 100 is shown in FIG. 3. In the expanded view of FIG. 3, touch sensors 116, including part of the drive electrode 202-2 and parts of two conductors 206 including a first conductor 302 and a second conductor 304 of the sense electrode 204-2 are illustrated.

The first conductor 302 is a mirror image of the second conductor 304. The first conductor 302 is operably coupled to the second conductor 304 by the jumper 212. The two conductors 302, 304 are also coupled to other conductors as part of the sense electrode 204-2 that extends across substantially the entire width of the display area and, optionally, into the non-display area. The conductors 302, 304 may comprise, for example, ITO disposed on a substrate or a part or layer of the touch-sensitive display 118. The member 208 of the conductor 302 has two elongate edges, including a first elongate edge 308 and a second elongate edge 310 on opposite sides of the member 208. The first elongate edge 308 and the second elongate edge 210 extend from the central member 208 to an outer edge 312 of the conductor 302. The second elongate edge 310 is longer than the first elongate edge 308. In this example, the second 310 is on a bottom side of the conductor 302 and the first elongate edge 308 is on a top side of the conductor 302. The outer edge 312 of the conductor 302 extends from an outer end of the first elongate edge 308 to an outer end of the second elongate edge 310. The outer edge 312 extends at an obtuse angle from the first elongate edge 308 and is at an acute angle with the second elongate edge 310. A tip 314 of the conductor 302, where the second elongate edge 310 meets the outer edge 312, may be shaped such that the tip 314 does not come to a sharp point. For example, the tip 314 may be rounded. The conductor 302 is substantially a mirror image of the conductor 304. The conductor 302 is spaced from the conductor 304 such that the distance between the ends of the first elongate edges 308 of the conductors 302, 304 is larger than the distance between the ends of the second elongate edges 310 of the conductors 302, 304.

In this example, the spacers 210, include a first spacer 316 and a second spacer 318 that are utilized between the conductor 302 and the drive electrode 202-2. One spacer 316 is spaced from the first elongate edge 308 and extends parallel to the first elongate edge 308. The space between the spacer 316 and the conductor 302 is small by comparison to the width of the conductor 302 or the width of the spacer 316. The spacers 316, 318 may comprise, for example, ITO. The spacer 316 has a first edge 320 and a second edge 322 on opposite sides of the spacer 316. The first edge 320 and the second edge 322 extend from part of the spacer that extends along the central member of the conductor 302 to an outer edge 324 of the spacer 316. The second edge 322 is longer than the first edge 320. In this example, the second edge 322 is on a bottom side of the spacer 316 and the first edge 320 is on a top side of the spacer 316. The outer edge 324 of the spacer 316 extends from an outer end of the first edge 320 to an outer end of the second edge 322. The outer edge 324 extends at an obtuse angle from the first edge 320 and is at an acute angle with the second edge 322. The second edge 322 of the spacer 316 is spaced from and extends parallel to the first elongate edge 308 of the conductor 302. The spacer 316 is generally parallel to the conductor 302 along the length of the first elongate edge 308.

The spacer 318 is spaced from the second elongate edge 310 of the conductor 302 and extends parallel to the second elongate edge 310. The space between the spacer 318 and the conductor 302 is substantially the same as the space between the spacer 316 and the conductor 302. The width of the spacer 318 is substantially the same as the width of the spacer 316. The spacer 318 has a first edge 326 and a second edge 328 on opposite sides of the spacer 318. The first edge 326 and the second edge 328 extend from part of the spacer that extends along the central member of the conductor 302 to an outer edge 330 of the spacer 318 shown in FIG. 3. The first edge 326 is longer than the second edge 328. In this example, the first edge 326 is on a top side of the spacer 318 and the second edge 328 is on a bottom side of the spacer 318. The outer edge 330 of the spacer 318 extends from an outer end of the first edge 326 to an outer end of the second edge 328. The outer edge 330 extends at an acute angle from the first edge 326 and is at an obtuse angle with the second edge 328. The first edge 326 of the spacer 318 is spaced from and extends parallel to the second elongate edge 310 of the conductor 302. The spacer 318 is generally parallel to the conductor 302 and does not extend along the entire length of the second elongate edge 310 of the conductor 302 such that the conductor 302 extends beyond the spacer 318.

The spacers 332, 334 are utilized between the conductor 304 and the drive electrode 202 to reduce cross coupling between the drive electrode 202 and the conductor 304. The spacers 332, 334 near the second conductor 304 are substantially mirror images of the spacers 316, 318 near the first conductor 302. Thus, the second conductor 304 and the spacers 332, 334 near the second conductor 304 are substantially mirror images of the first conductor 302 and the spacers 316, 318 near the first conductor 302.

An electrode jumper 212 is operably coupled to the conductor 302 and to the conductor 304 to electrically couple the conductors 302, 304. The electrode jumper 212 may comprise, for example, ITO, and may be disposed on the substrate or the part or layer of the touch-sensitive display 118 on which the drive electrodes 202-1, 202-2, 202-3, 202-4 and the sense electrodes 204-1, 204-2 are disposed. The electrode jumper 212 may be operably coupled to the conductors 302, 304, for example, by wires that extend into another plane of the touch-sensitive display 118, above the drive electrodes 202-1, 202-2, 202-3, 202-4, such that the wires do not interrupt or break the drive electrode 202. The electrode jumper 212 is generally elongate and, in this example, is generally V-shaped or chevron shaped. A first wire 338 is coupled to the electrode jumper 212 at or near one end 340 of the electrode jumper 212. The first wire 338 is also coupled to the conductor 302 at or near its tip 314. A second wire 342 is coupled to the electrode jumper 212 at or near an opposite end 344 of the jumper 212. The second wire 342 is also coupled to the conductor 304 at or near its tip 346. Thus, the drive electrodes 202 do not extend under the electrode jumpers 212, although the drive electrodes 202 extend under or below the wires 338, 342.

The electrode jumper 212 is offset from the tips 314, 346 of the conductors 302, 304 such that the electrode jumper 212 is not disposed directly between the tips 314, 346 of the conductors 302, 304. The conductors 302, 304 are aligned with other elements of the touch-sensitive display 118 such that a pixel electrode, for example, is aligned with the space between the tips 314, 346 of the conductor 302 and the conductor 304. By offsetting the electrode jumper 336, the electrode jumper 212 is not aligned with the pixel electrode and the optical qualities of the touch-sensitive display 118 are not negatively impacted or affected.

The drive electrode 202 extends around the electrode jumper 212 and between the conductors 302, 304. The drive electrode 202 does not extend between one spacer 316 and the conductor 302 or between the other spacer 318 and the conductor 302. The drive electrode 202 also does not extend between the mirror spacer 332 and the mirror conductor 304 or between the other mirror spacer 334 and the mirror conductor 304. The spacers 316, 318, 332, 334 are not actively utilized during touch sensing.

Utilizing sense electrodes that include a longer elongate edge and a shorter elongate edge, the space between the sense electrodes is generally increased by comparison to sense electrodes of other devices. Thus, the width of the drive electrode is relatively large, with the exception of a very small section of the drive electrode. The resistance in the drive electrode described above is reduced and is relatively small compared to a drive electrode that is not as wide. Lower resistance in drive electrodes facilitates increased scanning speed.

The terms top, bottom, left, and right are utilized herein to refer to the orientation of the elements illustrated in the drawings and are not otherwise limiting.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A touch-sensitive display comprising:
   a sense electrode comprising:
      a first conductor including a first member disposed on a first layer of a touch-sensitive display and having a first elongate edge and a second elongate edge on an opposite side of the first member as the first elongate edge, the second elongate edge being longer than the first elongate edge, a first outer edge extending from a first end of the first elongate edge to a second end of the second elongate edge to provide a first conductor tip where the first outer edge joins the second elongate edge;
      a second conductor including a second member disposed on the first layer of the touch-sensitive display and having a third elongate edge and a fourth elongate edge on an opposite side of the second member as the third elongate edge, the fourth elongate edge being longer than the third elongate edge, a second outer edge extending from a third end of the third elongate edge to a fourth end of the fourth elongate edge to provide a second conductor tip where the second outer edge joins the fourth elongate edge;
      wherein the first conductor is spaced from the second conductor such that a first distance from the second end of the second elongate edge to the fourth end of the fourth elongate edge is less than a second distance from the first end of the first elongate edge to the third end of the third elongate edge, and wherein a space between the first conductor tip and the second conductor tip is aligned with a pixel electrode of the touch-sensitive display;
      a jumper disposed on the first layer of the touch-sensitive display, on which the first conductor and the second conductor are disposed, at a location that is offset from the first conductor tip and the second conductor tip such that the jumper is not disposed directly between the first conductor tip and the second conductor tip and is not aligned with the pixel electrode;
      wherein the jumper is coupled to the first conductor and to the second conductor by a first wire that is spaced from the first layer of the touch-sensitive display such that the first wire extends into another plane of the touch-sensitive display, and is electrically coupled to the first conductor, near the first conductor tip and a second wire that is spaced from the first layer of the touch-sensitive display such that at least a portion of the second wire extends into the other plane of the touch-sensitive display, and is electrically coupled to the second conductor, near the second conductor tip; and a drive electrode spaced from the first conductor and the second conductor and extending around the jumper, and disposed on the first layer of the touch-sensitive display, on which the jumper is disposed, and under the first wire and the second wire, and between the first conductor and the second conductor.

2. The touch-sensitive display according to claim 1, comprising a first spacer spaced from and extending parallel to the first elongate edge and a second spacer spaced from and extending parallel to the second elongate edge along part of the second elongate edge such that the second spacer does not extend along the entire length of the second elongate edge.

3. The touch-sensitive display according to claim 1, comprising a first spacer spaced from and extending parallel the first elongate edge, a second spacer spaced from and extending parallel to the second elongate edge, a third spacer spaced from and extending parallel to the third elongate edge, and a fourth spacer spaced from and extending parallel to the fourth elongate edge, wherein the first spacer, the second spacer, the third spacer, and the fourth spacer are not utilized for touch sensing.

4. The touch-sensitive display according to claim 3, wherein the second spacer extends part of a length of the second elongate edge such that the second spacer does not extend along the entire length of the second elongate edge, and the fourth spacer extends along part of the length of the fourth elongate edge such that the fourth spacer does not extend along an entire length of the second elongate edge.

5. The touch-sensitive display according to claim 1, wherein the first conductor is a mirror image of the second conductor.

6. The touch-sensitive display according to claim 1, comprising spacers spaced from and extending parallel to the first conductor and second spacers spaced from and extending parallel to the second conductor, wherein the first conductor and the spacers are a mirror image of the second conductor and the second spacers.

7. The touch-sensitive display according to claim 1, wherein the first elongate edge is opposite the second elongate edge and wherein the third elongate edge is opposite the fourth elongate edge.

8. A portable electronic device comprising the touch-sensitive display according to claim 1.

9. The touch-sensitive display according to claim 1, further comprising a plurality of sense electrodes.

10. The touch-sensitive display according to claim 1, further comprising a plurality of drive electrodes.

* * * * *